United States Patent [11] 3,609,124

[72] Inventors Jacob Ackermann;
 Franco Ferre; Giorgio Anessi, all of Milan, Italy
[21] Appl. No. 747,430
[22] Filed July 25, 1968
[45] Patented Sept. 28, 1971
[73] Assignee Societa Italiana Resine S.p.A.
 Milan, Italy
[32] Priority Aug. 1, 1967
[33] Italy
[31] 19065-A/67

[54] PROCESS FOR STABILIZING POLYOXYMETHYLENES
 10 Claims, No Drawings
[52] U.S. Cl. ................................................... 260/67 FP
[51] Int. Cl. .................................................... C08g 1/24
[50] Field of Search .......................................... 260/67 FP

[56] References Cited
UNITED STATES PATENTS

| | | | |
|---|---|---|---|
| 2,964,500 | 12/1960 | Jenkins et al. ................ | 260/67 |
| 2,998,409 | 8/1961 | Nogare et al. ................ | 260/67 |
| 3,125,551 | 3/1964 | Punderson et al. ........... | 260/67 |
| 3,226,366 | 12/1965 | Bezzi et al. .................... | 260/67 |
| 3,351,614 | 11/1967 | Fiore et al. .................... | 260/67 |
| 3,355,428 | 11/1967 | Boyer et al. .................... | 260/67 |
| 3,406,151 | 10/1968 | Klinkmann et al. ........... | 260/67 |

Primary Examiner—William H. Short
Assistant Examiner—L. M. Phynes
Attorney—Sughrue, Rothwell, Mion, Zinn & MacPeak ABSTRACT: During the stabilization of a polyoxymethylene by means of a carboxylic acid anhydride in a liquid reaction medium, the concentration of monomeric formaldehyde in the vapor phase in equilibrium with the liquid phase is maintained at a value of from 1 to 50 percent (preferably 1-20 percent) by weight, whereby degradation of the polyoxymethylene is substantially reduced.

PROCESS FOR STABILIZING POLYOXYMETHYLENES

The present invention relates to an improved process for stabilizing high polymers of formaldehyde by a chemical reaction involving the terminal groups of the macromolecules.

More particularly, the invention relates to the preparation of polymers of formaldehyde of a sufficient thermal and chemical stability which makes them suitable for manufacturing thermoplastic products by extruding, injection-molding or the like, or films or fibers, by an improved process of blocking, more particularly esterifying, the terminal groups of the molecules of the polymers.

It is known that raw polymers of high molecular weight obtained by polymerization or copolymerization of formaldehyde or its cyclic trimer contain, to each macromolecule, at least one hydroxyl group which makes the product thermally unstable.

In order to avoid depolymerization of these products the hydroxyl groups at the ends of the chain are replaced by groups which are more thermally stable such as estereous or ethereous groups.

Esterification of polyoxymethylenes by acetic anhydride is one of the best methods for the purpose and was described by Staudinger in 1925.

For the esterification of the terminal hydroxyl groups of the polyoxymethylenes other anhydrides have been suggested, such as for instance the anhydrides of the propionic, butyric, pentanoic and hexanoic acid for use either separately or jointly.

The esterification reaction is generally carried out in the presence of special substances adapted to accelerate reaction or protect the chain of the macromolecules against dissociation processes.

Staudinger has also disclosed that basic substances, such as for instance pyridine are capable of accelerating esterification and thereby improving the esterified polymer output. Suitable catalysts for this purpose include tertiary amines and the salts of carboxylic acids, the latter being effective even when present in smaller quantities than the compounds suggested by Staudinger. Suitable compounds for protecting the macromolecular chain against dissociation processes or controlling the said chain length, such as triorgano-phosphines, stibines, arsines, etc. were described in a previous application by Applicants.

In conventional techniques the esterification of the terminal group of the polyoxymethylenes by reaction with anhydrides of carboxylic acid, especially by the anhydride of acetic acid, is carried out at temperatures exceeding about 120° C., preferably at temperatures at which the polymer is thoroughly dissolved in the esterifying agent, the esterification reaction being more easily completed by operating in a homogeneous liquid medium. However, under the conditions of the esterification reaction the polyoxymethylene is apt to degrade and set free monomeric formaldehyde from the terminal group of the macromolecules, the process being more accentuated as the temperature is higher.

Degradation is moreover strongly accelerated by the carboxylic acid present in the reaction medium in the form of impurity in the anhydride or arising from the water set free during the process of the esterifying reaction, or through degradation of the anhydride itself.

Even by operating the esterifying reaction in the presence of accelerating substances and/or by operating within the temperature range in which the ratio of the esterifying rate to the degradation rate is more favorable, the process may be attenuated but not fully eliminated.

A drawback arising from the degradation process is that the monomeric formaldehyde set free reacts in the liquid phase with the anhydride of the carboxylic acid thereby forming undesirable side products.

For example, when employing acetic anhydride as an esterifying agent, the diacetate of methylene glycol chiefly forms.

A set of tests carried out by Applicants disclosed that the formaldehyde set free as a consequence of degradation reacts by about 70–95 percent with the anhydride of acetic acid to form diacetate of methyleneglycol.

The reaction products of formaldehyde and anhydride of the acid may be considered as inert substances, for their esterifying power is much lower compared with the anhydride itself.

The esterification process of the polyoxymethylenes is consequently not very attractive from an economic point of view owing to the loss in reagents through formation of considerable quantities of side products, and the necessity of separating the latter which further complicates the process.

It has now been found that the polyoxymethylenes can be esterified by means of anhydrides of carboxylic acids by reaction in a liquid phase and in a homogeneous or heterogeneous medium, while substantially avoiding the formation of undesirable side products, when a concentration of monomeric formaldehyde in the vapor phase is maintained which is in equilibrium with the reacting liquid phase within a given range of values.

More particularly, it is found that, in order to fulfill the purposes of the invention, a concentration of monomeric formaldehyde should be maintained in the vapor phase at every stage of the reaction, which amounts to 1 to 50 percent by weight (preferably 1–20 percent by weight) with respect to the total weight of the vapors.

Any measure which will permit of carrying out the esterification reaction of the polyoxymethylenes in the manner described is useful for the purposes of the invention.

It is thereby possible to control conditions so as to maintain the reacting mass at its boiling point under such conditions that the composition of the vapor phase, at any stage of the reaction, may be maintained within the desired range of values.

It is further possible to fulfill the purposes of the invention by admitting inert gas under esterifying conditions through the reacting mass in order to maintain the gaseous phase under the above-mentioned conditions. In this particular case the gaseous phase essentially comprises the inert gas and the monomeric formaldehyde.

It should be noted that, where a flow of inert gas is employed the reacting mass may be kept boiling provided the formaldehyde concentration in the vapor phase is within the above-mentioned limits.

Finally, it is possible to admix the reacting mass with a liquid compound which under operative conditions is of a boiling point lower than the anhydride of the carboxylic acid so that the vapors are supplied essentially by the ebullition of this compound. In this case also the formaldehyde concentration in the vapor phase shall range within the above-mentioned limits.

Removal of the monomeric formaldehyde from the liquid phase as it is formed owing to the degradation processes substantially avoids the formation of undesirable side products, probably because the rate of reaction of the formaldehyde and anhydride of the carboxylic acid is much lower in the gaseous phase than in the liquid phase, though this occurrence cannot be explained in a fully satisfactory manner.

The process according to the invention affords in any case stabilized polyoxymethylenes by a simple and economically convenient process avoiding the shortcomings of the prior technique.

The esterification of the polyoxymethylenes may be carried out either continuously or discontinuously.

The polymer is preferably, but not necessarily, maintained in a dissolved condition in the esterifying agent, the latter comprising in the preferred embodiment the anhydride of acetic acid, though other anhydrides may be employed for the purpose of the invention.

The weight ratio of the anhydride of carboxylic acid to the polymer may vary within wide limits such as 1:3 to 30:1 or, in the preferred embodiment, of 1:1 to 15:1.

The esterification may alternatively be carried out in the presence of a diluting liquid, preferably an organic solvent, inert under the reaction conditions and of a boiling point equal to or lower than the boiling point of the anhydride of the carboxylic acid, or of solvents forming azotropic mixtures with the acid present or formed in the reaction medium, provided the azeotrope is of a lower boiling point than the anhydride of the carboxylic acid.

Useful solvents for the purpose of the invention include xylene, toluene, heptane, ethylbenzol, butylacetate and chlorobenzol.

The reaction may be carried out in the presence of basic esterifying catalysts, such as tertiary amines or pyridine or in the presence of salts of carboxylic acids. The chain stabilizers previously described may also be employed in order to avoid the formation of polymers of an excessively low molecular weight.

Useful temperatures for esterifying the polyoxymethylenes may range between 80° and 180° C., though the preferred embodiment is operated at 135° to 165° C., this giving the most favorable range of ratios of the esterifying to the decomposition rate.

As mentioned above the purposes of the invention are fulfilled by maintaining the concentration of the formaldehyde in the vapor phase within a range between 1 and 50 percent by weight with respect to the total weight of the vapors.

Ratios beyond the above-mentioned limits may be adopted, but this will increase the formation of side products; moreover the heat quantity required for reflux where the reacting mass is kept boiling, becomes excessive.

In actual practice the vapors evolved by the boiling mass are condensed, preferably at a temperature such as to avoid polymerization of the monomeric formaldehyde, and the anhydride of the carboxylic acid returned to the reaction medium.

In the preferred embodiment the vapors are fractionated in order to steadily remove the carboxylic acid present in the reaction medium, or being formed as water is set free on esterification, or on degradation of the anhydride.

Removal of the acid limits the previously described degradation processes.

EXAMPLE 1

50 g. raw polyoxymethylene containing 0.21 percent terminal $CH_2OH$ groups are mixed with 350 cu. cm. reagent. The reagent is a mixture of acetic anhydride and toluene in a 5 to 1 weight/weight ratio and contains 0.015 percent by weight of sodium acetate as a catalyst. The reactor, which comprises a glass autoclave provided with an oil heating jacket, anchor stirrer, thermometer, pressure gauge and reflux cooler is charged initially with 50 ml. of the above mentioned reagent, the contents being heated to boiling point while maintaining an absolute pressure of 1.52 atm. Thereafter, the mixture of polymer and reagent indicated above is charged to the reactor over 15 minutes by means of a piston pump. Heating is adjusted so that the reactor contents keep boiling and the reflux rate is 5 ml./min. at least. Formaldehyde concentration in the vapor phase is 5 percent by weight. On completion of addition the operation is pursued during 25 further minutes under the same conditions.

The temperature in the reactor amounts to 141° C., the polymer remaining suspended in the reagent. The mixture is then cooled, filtered and the polymer is washed with toluene, acetone and water. The diacetate of methyleneglycol is analytically determined in the filtrate before adding acetone.

The results are indicated in table 1, column (a).

A further esterification is carried out in the same manner by way of comparison. The parameters are the same as above, but for the pressure in the reactor which is raised to 2.5 atm. heating being maintained at a temperature of 141° C. Thus, the reaction mixture is not boiling. The results are summarized in table 1, column b.

TABLE 1

| | RUN | |
| --- | --- | --- |
| | a | b |
| Reflux/monomeric formaldehyde ratio | 20 | 0.5 |
| Recovered polymer (g.) | 45.5 | 44.5 |
| Side product (diacetate of the methylene glycol) (g.) | 1.7 | 19.8 |
| $CH_2OH$ group content in the stabilized polymer (%) | 0.02 | 0.02 |

EXAMPLE 2

Test 1

The esterification of the raw polyoxymethylene, obtained by polymerizing pure monomeric formaldehyde and 2 p.p.m. calcium caprolactam as a catalyst is carried out continuously. The intrinsic viscosity of the raw polymer (determined at 60° C. in p-chlorophenol containing 2 percent alpha pinene) is 1.78.

The apparatus comprises a stirred flask containing the raw polymer and reagent mixture, a piston pump for supplying the mixture to the reactor, a glass autoclave (reactor) as described in example 1, a connecting pipe provided with a heating jacket, for conveying the contents from the reactor bottom to the precipitating apparatus, and equipment for filtering, washing and drying the stabilized polymer.

The reactor is provided with a rectifying column 90 cm. high and 3 cm. in diameter, at the column top is a condenser; devices for discharging the noncondensable gas and drawing off the condenser contents are also provided. It is thereby possible to steadily remove the free acid formed during esterification or previously contained in the reactor.

The reagent comprises a mixture of acetic anhydride, ethylbenzene, N-dimethylcyclohexylamine in a 2:1:0.001 weight ratio. The acetic acid content in the anhydride is 0.3 percent by weight. A suspension of polymer and reagent containing 108 g. polymer per liter is prepared. 80 ml./min. suspension is fed to the reactor. The pressure in the reactor is adjusted to obtain a temperature of 154°/156° C. and the heating is adjusted to a total reflux rate of 16–18 ml./min. The formaldehyde concentration in the vapor phase is 2.5 percent by weight.

The polymer in the reactor and in the connecting tube between the reactor and precipitating apparatus is in a dissolved form.

The reactor and connecting tube contain 500/700 ml. and 400 ml. of the polymer solution, respectively.

The precipitation of the esterified polymer is effected in the precipitating apparatus by cooling. The suspension is filtered, washed with ethylbenzene and dried in vacuum at 100° C.

The diacetate of the methyleneglycol is analytically determined in the filtrate.

The intrinsic viscosity of the stabilized polymer amounts to 1.68.

The results are summarized in table 2, column "test 1."

Test 2.

By way of comparison a similar suspension of the raw polymer is esterified in a similar manner and on the same apparatus as employed for test 1. However, the pressure is raised by about 0.6 at. with respect to test 1, so that the reaction mass is not boiling, and heating is decreased so that the temperature in the reactor is 154°–156° C., namely, the same as in test 1. The intrinsic viscosity of the stabilized polymer is 1.65.

The results are summarized in table 2 in column "test 2."

TABLE 2

| | test 1 | test 2 (comparison) |
| --- | --- | --- |
| Recovered polymer output (%) | 96 | 88 |
| Increase in acetic acid in the reactor (%) | 0.05 | 0.5 |
| Formation of diacetate of methylene glycole (kg./kg. stabilized product) | 0.022 | 0.43 |
| Monomeric formaldehyde recovered as aqueous formaldehyde (kg. $CH_2O$/kg. stabilized product) | 0.03 | 0.015 |
| Thermal degradation $K_{220}$ (% min.) | 0.02 | 0.03 |

The expression $K_{220}$ indicates the constant of the thermal degradation at 220° C. in an inert atmosphere.

We claim:

1. In a liquid phase process for the stabilization of raw polyoxymethylenes by reacting terminal hydroxyl groups of the polyoxymethylene macromolecules with anhydrides of carboxylic acids, wherein monomeric formaldehyde is evolved due to the degradation of the polyoxymethylenes, the improvement comprising maintaining the concentration of evolved monomeric formaldehyde in the vapor phase in equilibrium with the liquid phase, the required concentration of monomeric formaldehyde being maintained by passing an inert gas through the liquid phase, thereby stripping monomeric formaldehyde from the liquid phase, the amount of formaldehyde being 1 to 50 percent by weight, based on the total weight of the vapors, whereby the reaction of monomeric formaldehyde with materials in said liquid phase is decreased, thereby reducing the formation of undesirable by-products.

2. The process of claim 1 wherein the ratio of said anhydrides of carboxylic acids to raw polyoxymethylenes is within the range 1:3 to 30:1, by weight.

3. The process of claim 2 wherein said stabilization reaction is carried out at a temperature within the range of 80° to 180° C.

4. The process of claim 2, wherein said range is 135° to 165° C.

5. The process of claim 1 further comprising fractionating said vapors all of which are evolved from said reacting mass, said vapors containing carboxylic acid, whereby said carboxylic acid is continuously recovered.

6. The process of claim 1 wherein said stabilization reaction is conducted in the presence of a catalyst selected from the group consisting of tertiary amides, pyridine and salts of carboxylic acids.

7. The process of claim 1 wherein said stabilization reaction is conducted in the presence of a chain stabilizer selected from the group consisting of triorganophosphines, stibines and arsines.

8. The process of claim 1 wherein the concentration of monomeric formaldehyde is 1–20 percent.

9. The process of claim 2 wherein said range is 1:1 to 15:1.

10. The process of claim 1 wherein the anhydride of carboxylic acid is the anhydride of acetic acid.